United States Patent

Shervington

[11] Patent Number: 5,962,943
[45] Date of Patent: Oct. 5, 1999

[54] AXIAL GAP DYNAMOELECTRIC MACHINE

[75] Inventor: Roger M. Shervington, Rockford, Ill.

[73] Assignee: Sunstrand Corporation, Rockford, Ill.

[21] Appl. No.: 09/032,716

[22] Filed: Feb. 27, 1998

[51] Int. Cl.⁶ .............................. H02K 21/14; H02K 3/04
[52] U.S. Cl. ........................... 310/156; 310/180; 310/184
[58] Field of Search ................................... 310/156, 180, 310/184, 198, 208, 268

[56] References Cited

U.S. PATENT DOCUMENTS

| | | | |
|---|---|---|---|
| 4,634,912 | 1/1987 | Heyraud | 310/268 |
| 5,396,140 | 3/1995 | Goldie et al. | 310/268 |

*Primary Examiner*—Nestor Ramirez
*Assistant Examiner*—Judson H. Jones
*Attorney, Agent, or Firm*—Wood, Phillips, VanSanten, Clark & Mortimer

[57] ABSTRACT

Lack of axial compactness in a dynamoelectric machine is avoided in an axial gap dynamoelectric machine including a disc (62, 66) rotatable about an axis (56) and adapted to be coupled to a shaft (54). At least two equally angularly spaced magnets (74, 76, 78, 80, 84, 86) are mounted on the disc (62, 66) and have their poles (N,S) facing in axial directions. A stator (72) is axially spaced but in close adjacency to the magnets (74, 76, 78, 80, 84, 86) and includes at least two equally angularly spaced groups of windings (92, 94, 96, 98). Each of the winding groups (92, 94, 96, 98) includes first and second winding loops (102, 104) with one of the loops (104) being wholly within the other of the loops (102) and in a common plane therewith.

8 Claims, 4 Drawing Sheets

AXIAL GAP DYNAMOELECTRIC MACHINE

FIELD OF THE INVENTION

This invention relates to dynamoelectric machines such as generators or motors, and more particularly, to an axial gap dynaomoelectric machine.

HEADING BACKGROUND OF INVENTION

Dynamoelectric Machines most commonly are of the so-called "radial gap" variety. In such machines, a rotor is journaled for rotation within a stator. The stator typically includes windings made up of electrical conductors that extend generally parallel to the axis of rotation of the rotor within the stator and which emerge from the ends of the stator iron. End turns connect designated ones of the conductors.

In the usual case, the conductors are located in slots in the stator and one group of the windings that is connected to another group of the windings by a given set of end turns is located radially outward from the rotational axis of the rotor relative to the other group of windings. That is, one winding group is at the top of its slot while the other is at the bottom of its slot. This allows groups of the conductors to be densely packaged within the stator slots without requiring extremely severe bends of the conductors at the end turns which may be only formed with difficulty, particularly where the conductor size is relatively large.

While these machines work extremely well for their purpose, the fact that the conductors generally parallel the axis of rotation of the rotor and the overall geometry of the machine requires the presence of the end turns, axial compactness of the dynamoelectric machine is difficult to achieve to the extent that such machines cannot be used in apparatus where a relatively short axial length is required.

It has been proposed to utilize axial gap dynamoelectric machines in such instances because of their lesser axial length. However, difficulty is experienced in extending radial gap winding geometry to axial gap machines due to space restrictions and the rigidity of winding sections. This is particularly true where radial space is limited.

The present invention is directed to overcoming one or more of the above problems.

SUMMARY OF THE INVENTION

It is the principal object of the invention to provide a new and improved axial gap dynarnoelectric machine. More specifically, it is an object of the invention to provide an axial gap dynamoelectric machine that has improved axial compactness with improved, axially compacted stator winding geometry.

An exemplary embodiment of the invention achieves the foregoing in an axial gap dynamoelectric machine that includes a disc rotatable about an axis and which is adapted to be coupled to a shaft. At least two equally angularly spaced magnets, each having two opposite poles, are located on a side of the disc with one of the magnets having one pole facing axially in a particular direction and the other magnet having its opposite pole facing axially in the particular direction. A stator is axially spaced in close adjacency to the one pole. The stator includes at least two equally angularly spaced groups of windings. Each of the groups of windings includes at least first and second winding loops with each loop including two angularly spaced, radially extending runs connected by radially inner and radially outer end turns. The runs and end turns of the second loop are in the same plane and within the runs and end turns of the first loop.

In a highly preferred embodiment, there are three of the groups of windings and the loops of each group are in a common plane. The winding loops of each group are spaced from the winding loops of each other group by 120° to define a three-phase machine.

Other objects and advantages will become apparent from the following specification taken in connection with the accompanying drawings.

DESCRIPTION OF THE PREFERRED EMBODIMENT

Figure 1:
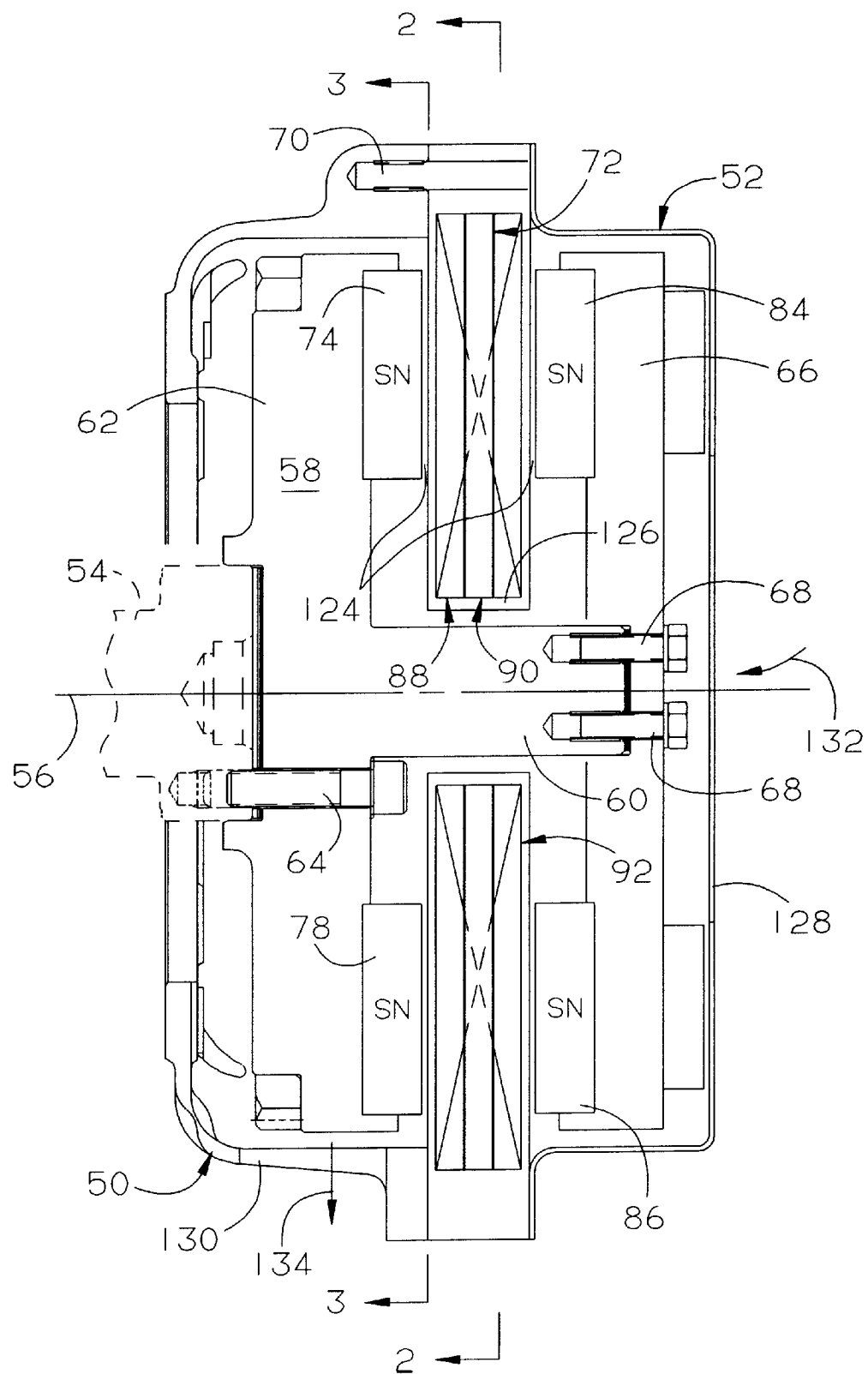
FIG. 1 is a sectional view of an axial gap dynamoelectric machine made according to the invention.

An exemplary embodiment of an axial gap dynamoelectric machine made according to the invention is illustrated in the drawings and will be described herein as a permanent magnet generator. However, it is to be understand that the invention may see use as a motor as well and may be used with efficacy in machines employing electromagnets rather than permanent magnets.

Referring to FIG. 1, the dynamoelectric machine is seen to include a bell-shaped casting, generally designated 50, serving as part of a housing. A stamped, cup-like element, generally designated 52 may also serve as part of the housing as well. Bearings, not shown, journal a shaft 54 for rotation about an axis 56 that extends through the housing 50,52. Within the housing 50, 52, a rotor 58 is located. The rotor 58 includes a stub shaft end 60 and a cylindrical disc-like end 62 which is several times the diameter of the stub shaft end 60. Preferably, rotor 58 will be made of a ferramagnetic material. Bolts 64 may be employed to couple the rotor 62 to the shaft 54 for rotation therewith.

A generally cylindrical disc 66, also of ferromagnetic material, may be coupled by bolt 68 to the stub shaft end 60. Bolts 70 extending between the housing cup 52 and the casting 50 sandwich a donut-like stator, generally designated 72, to locate the same within the housing thus defined and between the disc-like end 58 and the disc 66. The stator 72 is generally transverse to the axis 56.

Figure 3:
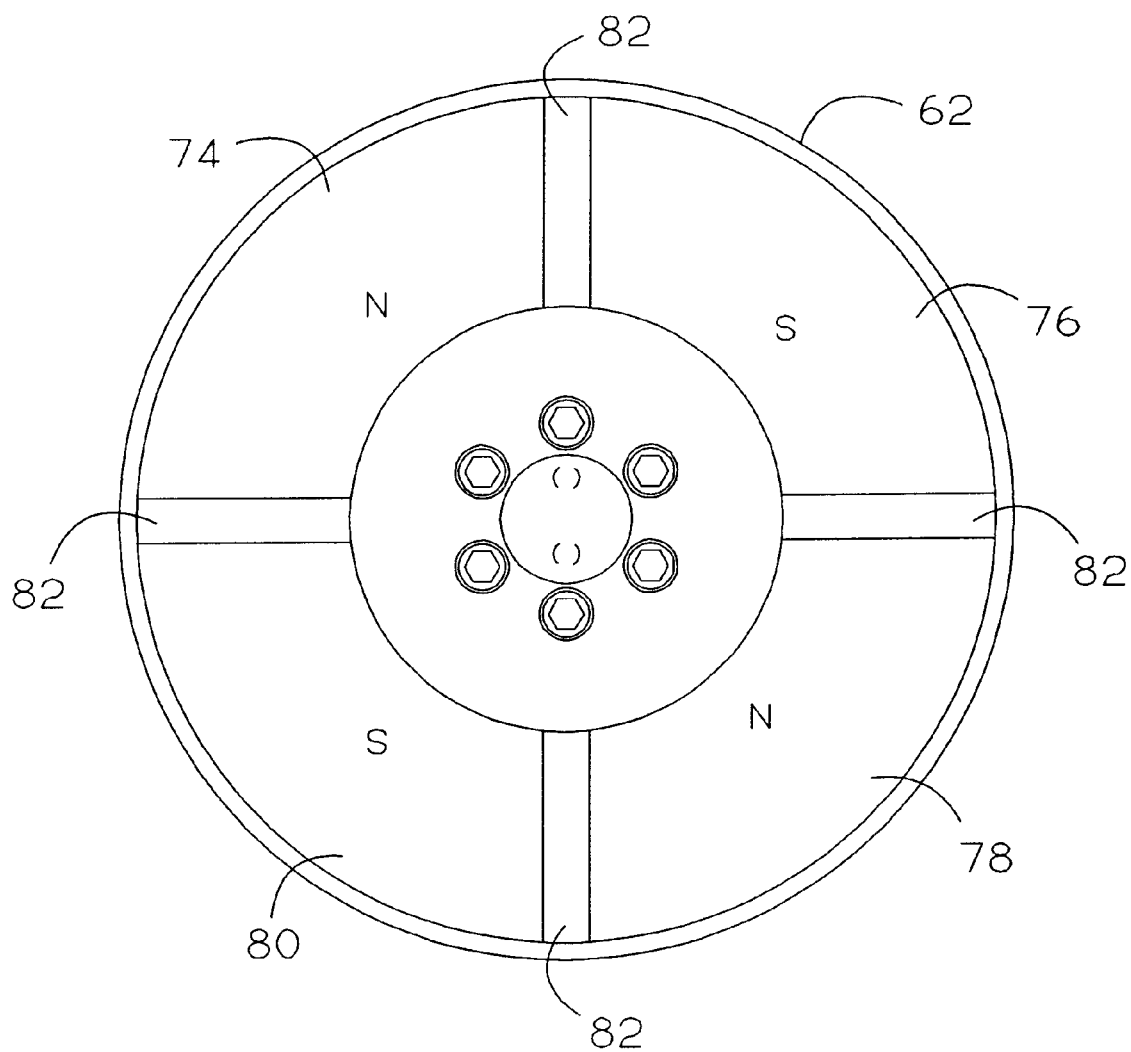
FIG. 3 is a sectional view taken approximately along the line 3—3 in FIG. 1.

Referring to FIGS. 1 and 3, the disc-like end 62 of the rotor 58 carries four arcuate permanent magnets 74, 76, 78 and 80. The magnets 74, 76, 78 and 80 are separated from one another by small gaps 82 and are arranged such that the south poles of the magnets 74 and 78 face axially toward the disc-like end 62 while the north poles of such magnets face axially toward the stator 72. The north poles of the magnets 76 and 80 will face the disc-like end 62 while the south poles thereof will face the stator 72.

Similar magnets, only two of which are shown at 84 and 86, are mounted on the disc 66. The magnets on the disc 66 are arranged so that their south poles are axially aligned with and face the north poles of the magnets 74 and 78 and the two magnets on the disc 66 that are not shown have their north poles aligned with and facing the magnets 76 and 80.

As generally alluded to previously, a preferred embodiment of the invention envisions a three-phase machine. As seen in FIG. 1, the stator 72 includes three sets of windings, generally designated 88, 90 and 92, one for each of the three phases. The stator 72 may be ironless with the windings 88, 90 and 92 potted or encapsulated in any suitable non-metallic matrix. However, it is also possible the locate the winding 88, 90 and 92 in an iron support if desired.

Figure 2:
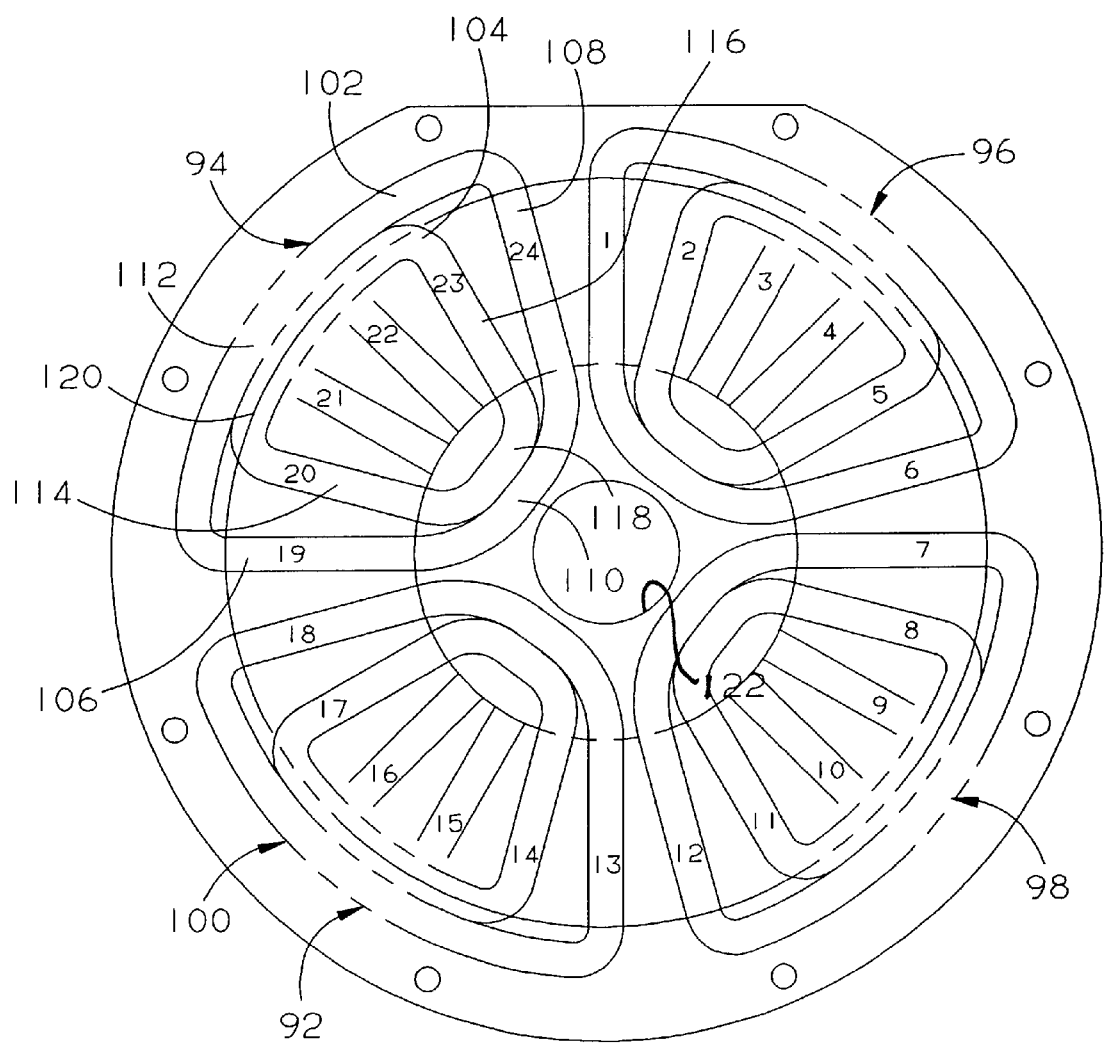
FIG. 2 is a sectional view taken approximately along the line 2—2 in FIG. 1.

Referring to FIG. 2, the winding set 92 will be described in detail. In this regard, it is to be understood that each of the winding sets 88, 90 and 92 are identical but are located within the stator 72 to be angularly spaced by 120° from each of the other sets 88, 90, 92.

Each of the winding sets 88, 90 and 92 is made up of four groups of windings, including a first group, generally designated 94, a second group, generally designated 96, a third group, generally designated 98, and a fourth group, generally designated 100. Each group 94, 96, 98, 100 in turn is made up of first and second winding loops 102 and 104, respectively. The winding loop 102 includes two angularly spaced, radially extending runs 106, 108, each made up of multiple conductors. The runs 106, 108 are connected at their radially inner ends by an end turn 110 and at their radially outer ends by an end turn 112. The second loop 104 is made up of radially extending runs 114 and 116 which are angularly spaced from one another. The radially inner ends of the runs 114 and 116 are connected by a radially inner end turn 118 while the radially outer ends are connected by a radially outer end turn 120. It is to be particularly noted that the runs 114, 116 and end turns 118, 120 of the second loop are wholly within the runs 106, 108 and end turns 110, 112 of the first loop 102 with the inner and outer end turns of each in substantial abutment with one another. This construction allows the loops 102 and 104 to be in a common plane to provide for axial compactness.

It will be appreciated that the resulting apparatus is a four pole machine that, when used as a generator, will provide 60 Hz alternating current when driven at about 1800 rpm. Of course, for other frequencies and/or drive rater and/or ratings, a greater or lesser number of winding groups and/or winding loops may be employed.

Each of the sets 88, 90, 92 includes an open center 122 through which the stub shaft 60 extends. As a consequence, it will be appreciated that the stator 72 is separated from the magnets 74, 76, 78, 80, 84, 86 by small axial airgaps 124 (FIG. 1).

In addition, a small radial gap 126 is located between the openings 122 and the outer diameter of the stub shaft end 60.

Desirably, an opening 128 is located in the housing element 52. A series of openings 130 may be located about the casting 50. Cooling air may enter the opening 128 in the direction of an arrow 132 and then exit the apparatus via the openings 130 in the direction of an arrow 134.

Alternatively, air may be drawing in at both ends of the rotor and expelled radially outward through aperature in the casting 50 (not shown) on either or both sides of the stator 72.

Figure 4:
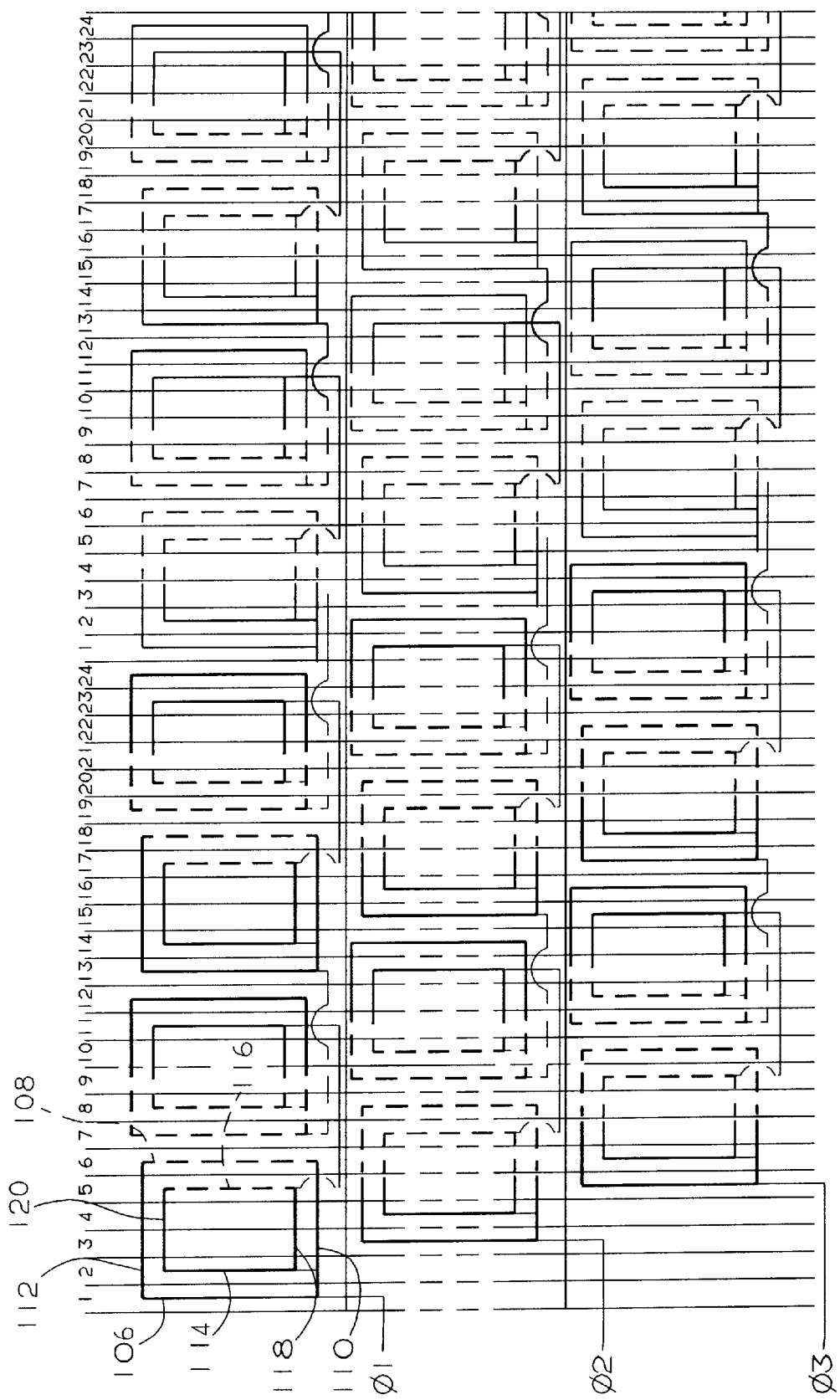
FIG. 4 is a schematic showing the interconnection of the various windings.

It will also be observed that the various runs of the various windings are given numbers from 1 to 24 in FIG. 2. These numbers correspond to the numbers illustrated in FIG. 4 which illustrate the electrical interconnection of each of the winding loops 102, 104 in each of the winding sets 88, 90, 92.

From the foregoing, it will be appreciated that an axial gap dynamoelectric machine made according to the invention achieves excellent axial compactness because all of the windings for each of the phase are in respective common planes and with the plane of the windings for each phase abutting the plane of the winding for another phase.

Moreover, the arrangement minimizes the spacial requirements for the various end turns and allows the same to be formed without unusually sharp bends which would be difficult to form with many conductors. As a consequence, a highly axially compact, highly efficient dynamoelectric machine is formed.

What is claimed is:

1. An axial gap dynamoelectric machine comprising:

a shaft mounted for rotation about an axis;

at least one generally cylindrical ferromagnetic disc carried by the shaft and extending radially outwardly therefrom;

a plurality of permanent magnets carried by said disc, said magnets having north and south poles facing in axially opposite directions with dissimilar poles of adjacent magnets facing the same direction;

a housing containing said shaft, said disc and said magnets;

a stator mounted in the interior of said housing and extending radially inwardly therein toward said shaft in adjacency to the magnets on said disc and separated therefrom by an axial air gap; and a plurality of three sets of electrical windings on said stator including a central set, each winding being formed in a loop, with certain of said windings being located within the loop of others of said windings, all the windings in each set occupying a common plane, the windings in said central set being sandwiched by the windings in the remaining sets, the windings in one of said remaining sets being angularly advanced by 120° with respect to the windings in said central set and the windings in the other of said remaining sets being angularly retarded by 120° with respect to the windings in said central set.

2. The axial gap dynamoelectric machine of claim 1 wherein there are at least two said discs axially spaced from one another with said stator located between said discs, each of said discs carrying a plurality of said permanent magnets with the poles of the magnets on one of said discs aligned with and facing the opposite poles of the magnets on the other disc.

3. An axial gap dynamoelectric machine comprising:

a housing;

a rotor journalled for rotation within said housing, said rotor having a stub shaft end and a disc-like end integral therewith, with said disc-like end having a diameter several times that of said stub shaft end;

a generally donut shaped stator within said housing and having a central opening thru which said stub shaft extends, said stator including three generally identical winding sets, each of a plurality of winding loops, in sandwiched relation with the windings in each set being 120° out of phase with the windings in the other sets, the windings in each set being in a respective common plane;

a disc within said housing and mounted on said stub shaft for rotation therewith; and permanent magnets carried by said disc and said disc-like end in close adjacency to said stator and separated therefrom by axial air gaps.

4. The axial gap dynamoelectric machine of claim 3 wherein some of the windings in each set are located within the loops of other windings of the same set.

5. The axial gap dynamoelectric machine of claim 3 wherein said disc and said rotor are formed of ferromagnetic material.

6. The axial gap dynamoelectric machine of claim 3 wherein each of said windings includes two angularly spaced, radially extending runs connected by radially inner and radially outer end turns.

7. The axial gap dynamoelectric machine of claim 6 wherein some of the windings in each set have their radially extending runs and radially inner and outer end turns within the radially extending runs and radially inner and outer end turns of others of the windings in the same set.

8. An axial gap dynamoelectric machine comprising:

a shaft mounted for rotation about an axis;

at least two generally cylindrical ferromagnetic discs axially spaced from one another and carried by the shaft and extending radially outwardly therefrom;

a plurality of permanent magnets carried by said discs, said magnets having north and south poles facing in opposite directions with dissimilar poles of adjacent magnets facing the same direction, each of said discs carrying a portion of said plurality of said permanent magnets with the poles of the magnets on one of the discs aligned with and facing the opposite poles of the magnets on the other disc;

a housing containing said shaft, said discs and said magnets;

a stator mounted in the interior of said housing and extending radially inwardly therein toward said shaft and located between said discs in adjacency to the magnets on said discs and separated therefrom by axial air gaps; and a plurality of three sets of electrical windings on said stator, including a central set, each winding being formed in a loop with certain of said windings being located within the loop of others of said windings, all the windings in each set occupying a common plane, the windings in said central set being sandwiched by the windings in the remaining sets, the windings in one of said remaining sets being angularly advanced by 120° with respect to the windings in said central set and the windings in the other of said remaining sets being angularly retarded by 120° with respect to the windings in said central set.

* * * * *